A. SEARLS.
Improvement in Top-Props for Carriages.
No. 131,569.  Patented Sep. 24, 1872.
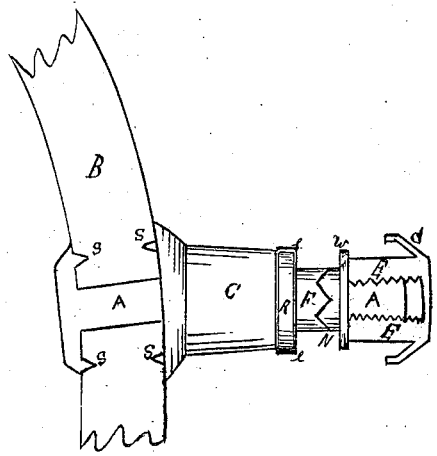
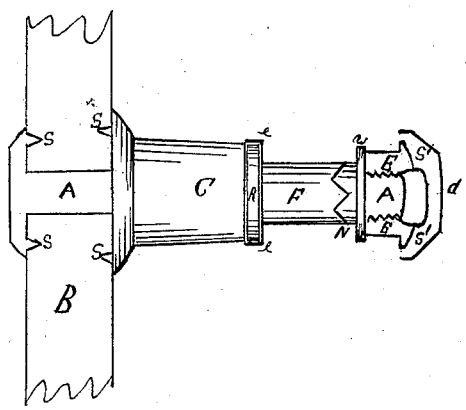
WITNESS
INVENTOR

UNITED STATES PATENT OFFICE.

ANSON SEARLS, OF NEWARK, NEW JERSEY.

IMPROVEMENT IN TOP-PROPS FOR CARRIAGES.

Specification forming part of Letters Patent No. 131,569, dated September 24, 1872.

*To all whom it may concern:*

Be it known that I, ANSON SEARLS, of Newark, county of Essex, State of New Jersey, have invented certain Improvements in Top-Props for Carriages, of which the following is a specification:

The nature and objects of my invention are, first, to prevent the bow from splitting where the bolt enters in that class of top-props that have a bolt through the bow for attaching a prop-joint, by using spurs under the head of the bolt, and one spur or more on the base of the cap that pierces the bow. Second, bending the bolt, and making the base of the front cap beveling, so as to conform to the turn of the bow, and bring the joint-bearing to a horizontal position. Third, it consists in the construction of a washer, between the outside of the prop-joint and the outside capped nut, to protect the nut from the action of the prop-joint. Fourth, in a rubber or metallic spring-washer on the prop-joint bearing to prevent rattling.

*Drawing.*

Figure 1 shows the cap C with spurs S on the base, and the joint-bearing F provided with notches N, impinging with like notches N on the washer w, the rubber spring R and cup-washer e inclosing it. Fig. 2 shows the front prop high on the turn of the bow B, and the base of the cap G made beveling to bring the joint-bearing F to a horizontal position.

Bolt top-props are usually made with an ordinary carriage-bolt passing through the bow, leather, and usually through the head-lining, and the head of the bolt being covered with cloth. The shank of the bolt being square it will split the bow when from any cause it is turned therein. The bolt has also been made with a T-head, and round at the shank. The T-head is put under the head-lining, and the two ends of the head clinched down on each side of the bow. I make the head of the bolt A with one spur, S, or more, arising from the internal surface of the bolt-head, so as to pierce the bow B, and prevent the same from splitting, as well as the bolt A from turning around in the bow. The cap C, that goes on the outside of the leather, has usually been made smooth on the base, and when used in bolt-props will slide or move on the bow. To overcome this, as well as to prevent the cap from turning from any cause, I make the cap C with one spur, S, or more, upon the base, that will pierce any substance upon which it may rest, sufficiently to hold it from turning or moving. The front prop in bolt-props often comes high on the turn of the bow, so as to throw the joint-bearing F out of a horizontal position. To remedy this I bend the bolt A where it passes through the bow B, and give the base of the cap C a proper angular form to conform to the turn of the bow, and bring the joint-bearing F to a horizontal position. To prevent the accidental loss of the nut E by the action of the prop-joints, I interpose the washer w with notched inward projections N, that engage with like notches N on the outer end of the joint-bearing F in such a manner that the washer cannot turn around with the prop-joints, thereby preventing all friction between the prop-joints and nut E. The notches N on the washer w, and joint-bearing F, may be of any desired form. The washer w may be applied to any top-prop, and held in place by the notches N. The annoyance of prop-joints rattling on the bearing F, and fitting too loose or too tight, I propose to remedy by applying a rubber or metallic spring-washer, R, which I place on prop-joint bearing, as shown. To conceal a rubber or spring washer from view, and protect it from injury by the prop-joints acting against it, I inclose it in the cup-washer e.

It will be seen that when the prop-joint is pressed against the washer e it compresses the washer or spring R, thereby preventing all rattling. Leather washers have been used in this place to take up any or all excess of space; but I do not use this washer for that purpose, as the leather washer shrinks up, is not durable, nor expansive.

I claim as my invention—

1. The spurs S attached to the internal surface of the head of bolt A, for the purpose set forth.

2. The spurs S attached to the base of the cap C, for the purpose set forth.

3. The cap C, made beveling on its base, and used in combination with the bolt A and bow B, as and for the purpose set forth.

4. The cap C, with the extended joint-bearing F, when provided with one notch, N, or more, for the purpose set forth.

5. The washer $w$, when provided with one notch, N, or more, for the purpose set forth.

6. The rubber or elastic metallic spring-washer R, in combination with the joint-bearing F, for the purpose set forth.

7. The cup or washer $e$, in combination with the spring-washer R and joint-bearing F, for the purpose set forth.

ANSON SEARLS.

Witnesses:
    JOHN A. GIFFORD,
    EPHRAIM BEACH.